(12) United States Patent
Vetter et al.

(10) Patent No.: US 9,780,908 B2
(45) Date of Patent: Oct. 3, 2017

(54) OPTICAL NETWORK TERMINAL (ONT) WAVELENGTH TUNING AND CORREPSONDING CALIBRATION PROCEDURE

(71) Applicant: Alcatel Lucent, Paris (FR)

(72) Inventors: Peter Vetter, Murray Hill, NJ (US); David A. Duque, Murray Hill, NJ (US); Robert L. Farah, Murray Hill, NJ (US); Joseph L. Galaro, Murray Hill, NJ (US); Man Fai Lau, Murray Hill, NJ (US); Wolfgang W. Poehlmann, Stuttgart (DE); Doutie T. van Veen, Murray Hill, NJ (US); Haibo Wen, Shanghai (CN)

(73) Assignee: Alcatel Lucent, Boulogne-Billancourt (FR)

( * ) Notice: Subject to any disclaimer, the term of this patent is extended or adjusted under 35 U.S.C. 154(b) by 96 days.

(21) Appl. No.: 14/179,660

(22) Filed: Feb. 13, 2014

(65) Prior Publication Data
US 2014/0233944 A1   Aug. 21, 2014

Related U.S. Application Data

(60) Provisional application No. 61/765,511, filed on Feb. 15, 2013, provisional application No. 61/767,542, filed on Feb. 21, 2013.

(51) Int. Cl.
*H04J 14/02*   (2006.01)
(52) U.S. Cl.
CPC ...... *H04J 14/0282* (2013.01); *H04J 14/0256* (2013.01)

(58) Field of Classification Search
CPC ..................................... H04J 14/025
USPC ................................... 398/34, 67
See application file for complete search history.

(56) References Cited

U.S. PATENT DOCUMENTS

| | | | |
|---|---|---|---|
| 2008/0138072 A1 | 6/2008 | Sakamoto | |
| 2008/0166127 A1 | 7/2008 | Kazawa | |
| 2008/0267627 A1* | 10/2008 | Effenberger | H04B 10/272 398/72 |
| 2011/0200326 A1* | 8/2011 | Kazawa | H04J 14/0282 398/25 |

(Continued)

FOREIGN PATENT DOCUMENTS

| | | |
|---|---|---|
| JP | 2007195227 A | 8/2007 |
| JP | 2008172351 A | 7/2008 |

(Continued)

*Primary Examiner* — David Payne
*Assistant Examiner* — Omar S Ismail
(74) *Attorney, Agent, or Firm* — RGIP LLC

(57) ABSTRACT

Tuning an optical network unit (ONU) to an appropriate communication wavelength may be performed by initiating an activation procedure responsive to receiving a wavelength configuration message, and identifying an instruction in the wavelength configuration message to modify a present wavelength used by the network unit to a different wavelength. The process may also provide assigning an optical network unit identifier (ONU-ID) to the network unit, modifying the present wavelength to the different wavelength, and transmitting subsequent data messages from the network unit at the different wavelength.

15 Claims, 17 Drawing Sheets

(56) References Cited

U.S. PATENT DOCUMENTS

| | | | |
|---|---|---|---|
| 2011/0236017 A1* | 9/2011 | Ohlen | H04J 14/0282 398/34 |
| 2012/0008958 A1* | 1/2012 | Dahlfort | H04J 14/0282 398/85 |
| 2012/0128373 A1* | 5/2012 | Smith | H04B 10/503 398/158 |

FOREIGN PATENT DOCUMENTS

| | | |
|---|---|---|
| WO | 2010064119 A1 | 6/2010 |
| WO | 2012071157 A1 | 5/2012 |

\* cited by examiner

500

600

800

1000

1100

OPTICAL NETWORK TERMINAL (ONT) WAVELENGTH TUNING AND CORREPSONDING CALIBRATION PROCEDURE

CROSS REFERENCE TO RELATED APPLICATIONS

This application claims benefit to provisional application Nos. 61/765,511, entitled "Apparatus and Method for Tuning an ONU in a PON", filed on Feb. 15, 2013, and 61/767,542 filed on Feb. 21, 2013 entitled "Apparatus and method for tuning an ONU in a PON", and this application is related to application Ser. No. 13/167,380 entitled "METHOD AND APPARATUS OF PERFORMING ONT WAVELENGTH TUNING VIA A HEAT SOURCE", filed on Jun. 23, 2011, the entire contents of which are hereby incorporated by reference.

TECHNICAL FIELD

This application relates to modifying or tuning frequency/wavelength characteristics used by an optical device, and, in particular, to identifying situations when a wavelength change is warranted.

BACKGROUND

In general, different forms of wavelength division multiplexing (WDM) passive optical networks (PONs) face dilemmas with deploying networks utilizing cost effective optical network termination units (ONTs). Fiber optic cabling, termination units and related hardware are expensive and require significant amounts of precision tuning in order to maintain optimal performance.

The ONT, in general, must be configured to operate at a specific wavelength or wavelength group based on a random assignment from the central office equipment. The wavelength assignment scheme may be performed by an optical line terminal (OLT), which assigns the same wavelength to more than one ONT. Alternatively, the assignment scheme may assign one wavelength or a set of wavelengths to a particular group of users, which, in turn, are utilized by a corresponding group of ONTs. PONs require constant configuration and reconfiguration for wide-scale deployment. There is an ongoing challenge to produce color-less laser transmitters in the ONTs of the PONs that are cost effective, while providing flexibility with the wavelength tuning, assignment and adjustment procedure.

When implementing wavelength division multiplexing (WDM) wavelength assignments, the implementation must be planned to accommodate a large number of ONTs. WDM PON systems may not require a single wavelength per end user in the downstream and upstream directions. Within the user access environment, it is necessary to accommodate continuously growing user bandwidth requirements while maintaining a reasonable cost basis.

SUMMARY

One example embodiment may include a method that provides initiating an activation procedure for a network terminal responsive to receiving a wavelength configuration message, identifying an instruction in the wavelength configuration message to modify a present wavelength used by the network terminal to a different wavelength, assigning an optical network unit identifier (ONU-ID) to the network terminal, modifying the present wavelength to the different wavelength, and transmitting subsequent data messages from the network terminal at the different wavelength.

Another example embodiment may provide an apparatus that includes a receiver and a processor configured to initiate an activation procedure responsive to a wavelength configuration message received via the receiver and identify an instruction in the wavelength configuration message to modify a present wavelength being used to a different wavelength. The apparatus may also include the processor being configured to assign an optical network unit identifier (ONU-ID), modify the present wavelength to the different wavelength, and a transmitter configured to transmit subsequent data messages at the different wavelength.

DETAILED DESCRIPTION OF THE APPLICATION

It will be readily understood that the components of the present application, as generally described and illustrated in the figures herein, may be arranged and designed in a wide variety of different configurations. Thus, the following detailed description of the embodiments of a method, apparatus, and system, as represented in the attached figures, is not intended to limit the scope of the application as claimed, but is merely representative of selected embodiments of the application.

The features, structures, or characteristics of the application described throughout this specification may be combined in any suitable manner in one or more embodiments. For example, the usage of the phrases "example embodiments", "some embodiments", or other similar language, throughout this specification refers to the fact that a particular feature, structure, or characteristic described in connection with the embodiment may be included in at least one embodiment of the present application. Thus, appearances of the phrases "example embodiments", "in some embodiments", "in other embodiments", or other similar language, throughout this specification do not necessarily all refer to the same group of embodiments, and the described features, structures, or characteristics may be combined in any suitable manner in one or more embodiments.

Example embodiments of the present application may provide implementing a wavelength division multiplexing (WDM) communication system with a tunable wavelength transmitter/receiver. When operating a PON communication system, one approach to maintaining a reasonable cost structure may include allocating a single wavelength or a group of wavelengths to a particular group of users. The overall bandwidth efficiency may increase as a result of a number of users sharing the same wavelength or wavelength group.

Figure 1A:
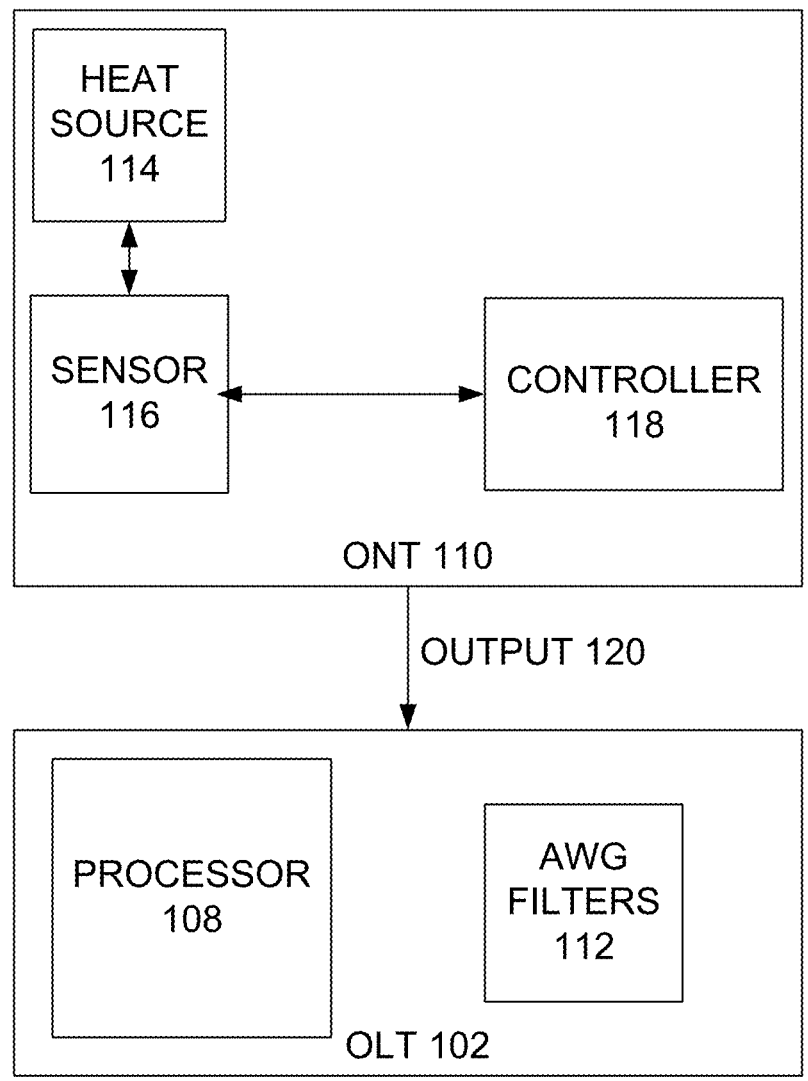
FIG. 1A illustrates an example of a passive optical network configuration according to example embodiments.

FIG. 1A illustrates an example OLT and ONT system configuration, according to example embodiments of the present application. Referring to FIG. 1A, an OLT 102 may be located at a central office and may include arrayed waveguide grating (AWG) filters 112 and a processor 108. Specifically, the AWG filters 112 are cyclic AWG filters. The OLT 102 may be connected to the remote ONT 110, or may be in communication with the remote ONT 110, which includes an ONT laser device.

The ONT laser device may have a tunable laser that includes a heat source 114, sensor 116 and controller 118. The output 120 is a laser signal that has been modified by the heat source 114 to operate at a particular wavelength. The ONT 110 also includes a sensor 116 and a controller 118. In operation, the signal present from the ONT at the AWG filters 112 may detect a needed temperature adjustment of the ONT laser device and transmit a control signal to the ONT laser device of the ONT 110. The control signal may be used to activate the heat source 114. The sensor 116 provides feedback regarding the temperature of the ONT laser device, which is part of ONT 110 and provides the feedback to the controller 118, which is also part of ONT 110. The controller 118 may then increase the amount of heat applied to the surface of the laser transmitter of ONT 110, or, reduce the amount of heat if the temperature is higher than necessary to modify the wavelength of the present signal. The amount of heat applied is based on a predefined amount of heat needed to tune the wavelength of the ONT laser device. The amount of heat may be defined in a table used to correlate with the tuning of the desired wavelength of the signal, which is stored in memory (not shown).

As described above, an ONT/ONU wavelength can be tuned to match the channels of a cyclic AWG by using a heater that has been integrated with the laser diode. Example embodiments provide an activation process for the wavelength tuning of an upstream transmitter and a downstream receiver in a TWDM-PON using the wavelength set principle as enabled by a cyclic arrayed waveguide grating (AWG).

The present application provides configurations for downstream tuning of the receiver in the ONU and upstream tuning of the transmitter in the ONU, avoidance of interference with regular traffic during tuning of the upstream wavelength at the ONU, resolution in case of successful reception on multiple receivers at the OLT, and handling a channel hop within the same wavelength set, which is specific for the cyclic AWG approach. An introduction of hysteresis may be applied to threshold values to minimize frequent up and down tuning procedures. A definition of required message types may be proposed in standardization as extensions to an existing PLOAM system.

A complete process for tuning of a downstream receiver may provide processes for tuning of an upstream transmitter during coarse tuning and fine tuning intervals. The examples included herein provide different implementations and options that trade-off implementation complexity versus the total duration to complete a tuning process. Other example embodiments may include a solution for avoidance of interference with on-going traffic by opening of quiet windows simultaneously on all upstream channels. Also, other examples provide a configuration to resolve cross-talk on more than one upstream channel, and a process to trigger and control a channel hop within the same wavelength set, which is specific for the cyclic AWG approach. Other processes may include an extension to the standard activation process for a TDM-PON, which enhances the probability of acceptance in standardization and reusing existing capabilities such as time ranging with equalization delay, collision avoidance during simultaneous activation of ONUs, serial number detection and assignment of an ONU-ID, etc. Single physical layer operations and management (PLOAM) message types may be used to control the processes for wavelength tuning of existing and target transmitter and receiver wavelengths, as an extension to the existing PLOAM message definitions. Reuse of a PON-ID for identification of a downstream channel may be used in a TWDM-PON scheme.

According to example embodiments, a wavelength initialization protocol is utilized for an ONU that is connected to a time and wavelength division multiplexing passive optical network (TWDM-PON). The specifications for the TWDM-PON may provide that the initial wavelengths in the upstream and/or downstream of the ONU are unknown. A tunable laser in the ONU may not be calibrated for absolute wavelengths as a function of heater current at different ambient temperatures in order to save manufacturing costs. As a result, relative changes can be configured in a reproducible way. The tunable filter of the receiver in the ONU may not be calibrated for absolute wavelengths as a function of a set (e.g. control voltage) and ambient temperature in order to save manufacturing costs. Certain relative changes of a filter setting can be configured in a sufficiently reproducible way.

The tuning process should not corrupt regular data traffic of other ONUs on the PON that are already in service. The initialization protocol should be compatible with the existing initialization protocol for XG-PON1 (or 10 GB-EPON). Similar to XG-PON1, the protocol should be able to handle multiple ONUs trying to initialize at the same time. Wavelength tuning is performed by an on-chip heater element. The emission wavelength of a DFB laser is proportional to the junction temperature, and to a lower extent the bias current. Parasitic effects that need to be considered are the change of wavelength by a bias current controller, the laser self-heating during a burst change of wavelength with time in a burst, and changes in ambient temperature. A grid spacing of λ may be assumed between two pass bands of the AWG (e.g. 100 GHz in FIG. 2).

The pass wavelength of the downstream receiver (Rx) filter in the ONU may not be known at the start-up of the ONU in order to avoid a calibration of a voltage control setting, ambient temperature, and/or wavelength, and achieve a low cost implementation. As a first operation, the Rx filter scans with increments until it achieves a maximum received signal strength indication (RSSI) using a local control loop on the ONU. As the ONU scans the filter values, it successfully receives downstream framing, it should be able to detect on which channel number it is tuned. The existing PON-ID may be used which is in the current standard downstream physical layer synchronization block (PSBd) as defined in GPON or XG-PON1, but any other separate message can be used for that purpose. If the current downstream is different from the target downstream, the ONU may decide to shift to a different filter setting, or keep the current filter setting until completion of the activation process. There may be no RSSI implemented and thus a scanning of the Rx filter may be performed until a successful downstream synchronization is achieved. The channel identified will be used for the subsequent initialization of the upstream and can be any of the four possible downstream channels.

The setup process is similar to standard GPON and XG-PON1 configurations with the exception of wavelength settings. Example embodiments of wavelength settings may begin with a target coarse tuning process also referred to the 'improved' tuning process, in which four OLT upstream receivers are simultaneously used. Then a simple tuning process may also be implemented that is easier to implement than the coarse process and which can be used in association with the coarse process to provide added benefits. In both processes, a quiet ranging window is opened on all four upstream channels at the same time.

Figure 1B:
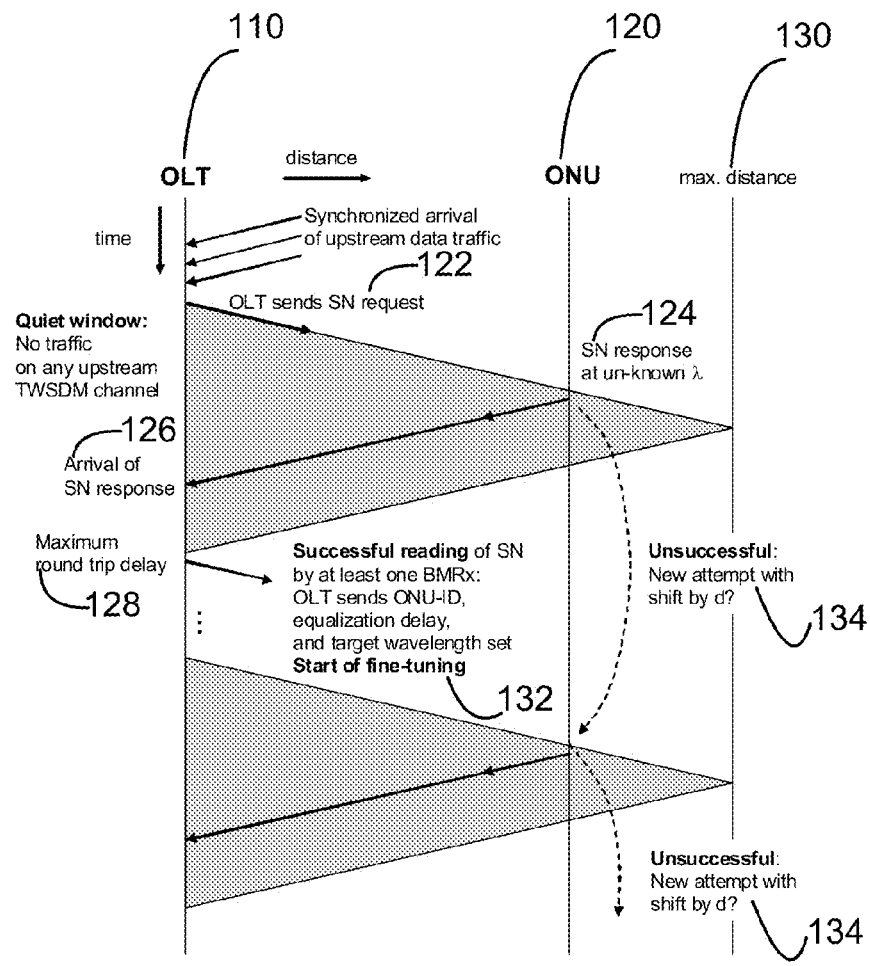
FIG. 1B illustrates an example activation procedure of an optical network unit, according to example embodiments of the present application.

FIG. 1B illustrates an example activation procedure of an optical network unit, according to example embodiments of the present application. Referring to FIG. 1B, the communication configuration process 100 includes two main entities, including the OLT 110 which initiates communication with the ONU 120. In operation, the wavelengths in a downstream and an upstream flow are used pair-wise as one TDM XG-PON1 system for simplicity. For example, a wavelength channel is identified using the PON-ID field in the XG-PON downstream physical synchronization block. This activation process of the ONU in the TWDM-PON is performed with a simultaneous quiet window on all upstream channels.

Figure 3A:
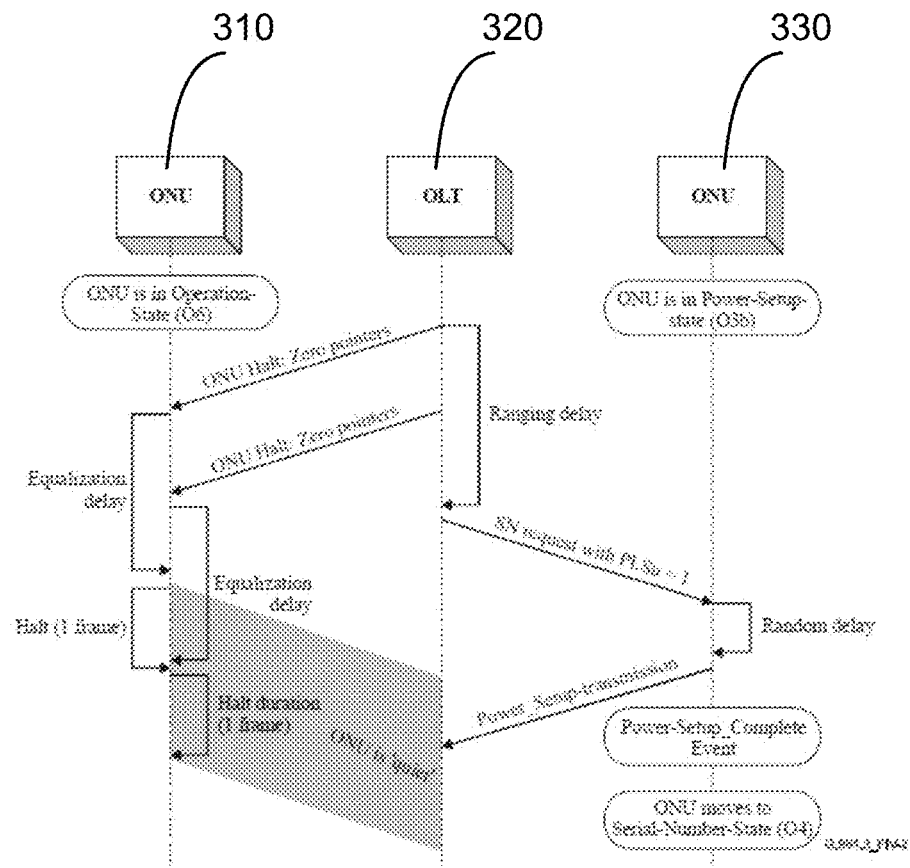
FIG. 3A illustrates an example power setup procedure, according to example embodiments of the present application.
Figure 3B:
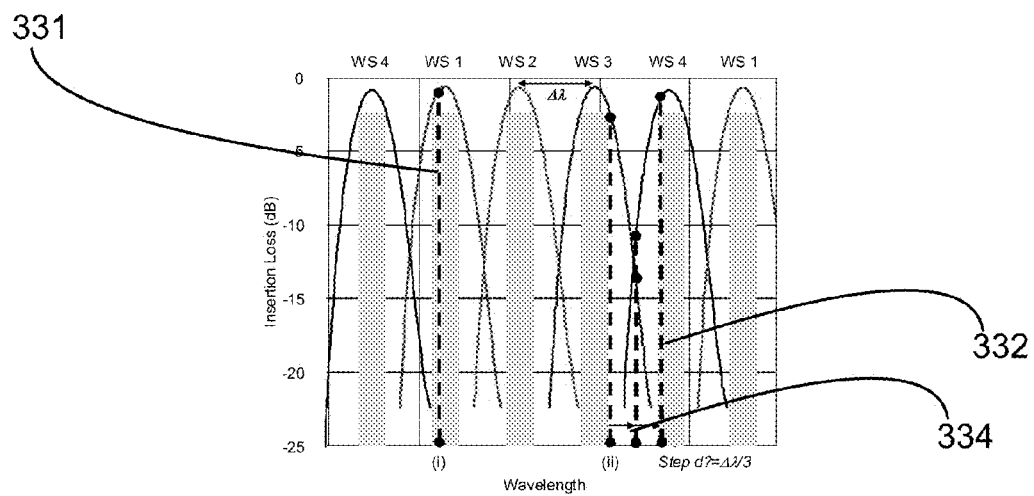
FIG. 3B illustrates a graph of a transmission spectrum per port for a weak upstream signal.

Referring to FIG. 1B, the temperature of the laser is set to start as a temperature ($T_{start}$) or is left at its initial value. The ONU has passed an initial-state 'O1' (power on settings), the ONU downstream receiver is tuned to any one of the four wavelengths that will be used for the downstream tuning PLOAM messages. The ONU continues then to standby-state 'O2' (received DS traffic), power-setup-state 'O3' (power settings) and is now in the serial-number-state 'O4'. When the ONU receives a serial-number request from the OLT 122, it sends its serial number 124, which is received at the OLT 110 at message 126. If the wavelength is in a pass band of the AWG (e.g. (i) 331 in FIG. 3B), the OLT will receive the serial number of the ONU, it assigns an ONU-ID. For the WSDM it also informs the ONU on which wavelength-set it is currently operating and assigns it to one out of "N" wavelength-sets and sends this information DS via message 132. If the ONU received the ONU-ID and wavelength-set, the process continues, however, if the ONU 120 does not receive the ONU-ID (e.g. wavelength is at position (ii) 334 in FIG. 3B), it autonomously increases the laser temperature to achieve a Δλ/n offset via operation 134. The step size is select so that it is slightly smaller than the width of the intervals that allow for successful transmission (e.g. n=3 in the example 332 and 334 of FIG. 3B). A maximum distance 130 is used to help calculate a maximum round trip delay 128.

If the ONU 120 is not on the correct wavelength set, it tunes by another Δλ/n. A successful reading should be achieved after a maximum of 'n' steps. The number of steps is a trade-off with the optical budget penalty with the maximum transmission of the AWG. The ONU goes to the ranging-state 'O5'. The rest of the activation process (i.e., ranging, etc.) is not specific to WSDM-PON.

In order to simplify the implementation for a phase II demo, the wavelength is tuned over the entire range of all four channels in increments Δλ/n, until the upstream channel is identified that is paired with the downstream channel that the ONU Rx is currently listening and successfully read the serial number (SN). The standard initialization process may then be completed with the assignment of an ONU ID, and the ONU is then ready to begin service. The ONU 120 autonomously steps through the wavelength after every quiet window. The process is controlled by the processor in the ONU that sends target values and relative changes to the control processors, which control the heater in the laser. No modification may be required in the OLT.

In the protocol configuration, the 4 channels are listening to the upstream at the same time, but only one downstream channel is able to communicate with the ONU during the activation procedure. It is assumed four independent XG-PON1 systems are used for the simplicity of the first prototype. The SN may be successfully read on any of the Rx ports and each of the corresponding downstream Tx ports will send a confirmation and assign an ONU ID to the ONU. However, when the upstream wavelength reaches the channel of the Rx that is paired with the downstream channel that the ONU is tuned to use, the ONU will actually receive the confirmation and ONU ID. The ONU knows the channel it is operating on due to the PON ID in the downstream. The OLT will operate on a channel it is connected once it receives upstream PLOAM messages with the assigned ONU ID on the corresponding upstream channel.

In the target process, the successful SN read happens at any one of the 4 possible channels, in order to accelerate the initialization time in the worst case by a factor of 4. The PON OLT should then be able to communicate the SN and upstream channel via the downstream even if the upstream and downstream channels are not yet paired. After a successful communication, the OLT communicates a wavelength shift to the desired upstream channel by a targeted PLOAM message to the ONU-ID/PON-ID.

In one example embodiment, the case of having cross-talk across neighboring upstream channels may be difficult to satisfy. A solution may be implemented in the target protocol by performing a successful reading of the SN after three quiet ranging windows when it is assumed a step slightly smaller than Δλ/2. This corresponds to a 3 dB of the receiver sensitivity margin relative to the maximum transmission of the pass band of the AWG. It is however possible to achieve an optimized receive sensitivity and optimize the optical budget of the system in various ways, such as by selecting a smaller step size, e.g. Δλ/3 or Δλ/4, resulting in a longer activation time for the worst case by additional tuning steps $\Delta\lambda/8$ and $\Delta\lambda/16$, etc. Another option may be to perform oversampling of the same serial number by four, either by a four times slower clock speed of the code of the SN or by repeating the SN four times sequentially, in the same upstream ranging message. Also, it may be optimal to identify if there is a reasonable probability of a successful serial number about 100 bits long read when the signal to noise ratio (SNR) bit error rate (BER) 1E-4 before FEC is not achieved—if there is a failure, a next attempt may be successful.

Figure 3C:
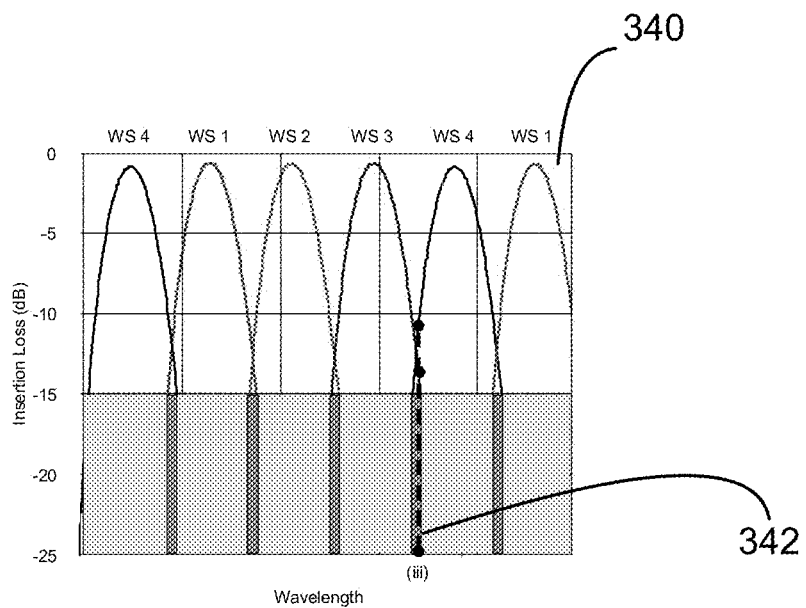
FIG. 3C illustrates a graph of a transmission spectrum per port with overlapping areas for a strong upstream signal.

It is possible that the OLT does not read any SN after the initialization sequence. If an ONU tried to range, but does not receive an ONU-ID at the end of this sequence, an error occurred (e.g. a collision or bit error) and the ONU should start over again up to three such sequences. This approach may result in faster ranging for the majority of the cases than repeating each step of the ranging three times before proceeding to the next operation. In cases that the receive power at the OLT is high, it is possible to successfully read the serial number in two neighboring channels (see 342 of the graph 340 of FIG. 3C). If this occurs, a simultaneous measurement of the signal power by a burst mode RSSI in each channel should be used to determine the channel with the highest signal power level and the required wavelength shift to avoid cross talk. Since the SN of the ONU is known from this stage onwards, the OLT can send a targeted PLOAM message with the required wavelength shift. Once the wavelength is centered in a pass band, cross-talk suppression between neighboring channels will be according to a specification. Quiet ranging windows (potentially shorter) should be used until the elimination of the cross talk is confirmed.

Alternatively, if no RSSI measurement is possible at the OLT during the coarse ranging procedure, the OLT may assume that the wavelength is approximately in the middle of two neighboring receive channels and therefore order a wavelength shift of half a channel spacing. In some cases only one channel successfully reads the SN of an ONU, but there is a RSSI power detected in more than one channel simultaneously due to cross-talk. The relative power difference can still be used to tune the wavelength and a targeted PLOAM message can be sent to the ONU.

In the case of a pre-registered ONU, the OLT has the SN and can send targeted ranging grants. As a result, the OLT is sure that only one ONU is ranging at that time. Power detection, even if the upstream message content cannot be correctly read, is then already sufficient to localize the ONU. This subsequent ranging window can thus be shorter and it is possible to open a short ranging window more frequently without too much delay overhead on the regular traffic. Even if the OLT is not able to read a serial number in the upstream message, it is possible in this case to use the relative change RSSI measurement between different quiet windows to tune the wavelength, because the OLT can send a targeted feedback message. This is generally not possible in the case of multiple ONUs ranging at the same time.

During normal operation, the OLT can instruct an ONU to change the wavelength set channel. The ONU should not be permitted to send upstream traffic until the tuning response (about 200 μs) is completed. A new activation process is recommended for coarse tuning to the new target wavelength. Opening a quiet window simultaneously for all channels is performed, when the transceivers of the respective channels are integrated on the same line card.

Wavelength fine tuning and stabilization of ONU transmitter may be performed when the ONU is actively sending and receiving traffic in the PON. A wavelength stabilization process (dithering) keeps the wavelength in the center of the cyclic AWG filter. It is assumed that that the ONU sends a PLOAM message since traffic data may get lost during the dithering and a PLOAM message is more secure. However, data traffic may be sent instead and to allow an additional power margin to accommodate an accidental 5 GHz dither down the transmission slope at the edge of a pass band. Next, the OLT may request the ONU to tune the US wavelength by 5 GHz (O-band 0.34K) up. The ONU waits until the tuning is finished (e.g. 0.2 ms) and then sends upstream packet data. The OLT measures the received power by a fast RSSI (transceiver study group, RSSI strobe). The OLT compares the new RSSI value with the previous. If the new RSSI value is higher, it instructs the ONU to permanently shift to the new wavelength. This means it is on a rising slope and will probe another 5 GHz in the same direction at the next dithering operation. If the new RSSI value is lower, it instructs the ONU to stay at its old wavelength. It will also probe 5 GHz in the opposite direction at the next dithering operation. The current RSSI measurement requires a minimum packet length (e.g. 100 ns). The OLT ensures the upstream PLOAM packet on which the RSSI value is measured is sufficiently long so that no packets from other ONUs are integrated in the same measurement. The signal strength measurement and decision may be performed on a single or PLOAM data packet or accumulated over a number of packets to achieve a more accurate value. The latter will require more time, but may be useful if the tuning process is slow due to network traffic.

Figure 2A:
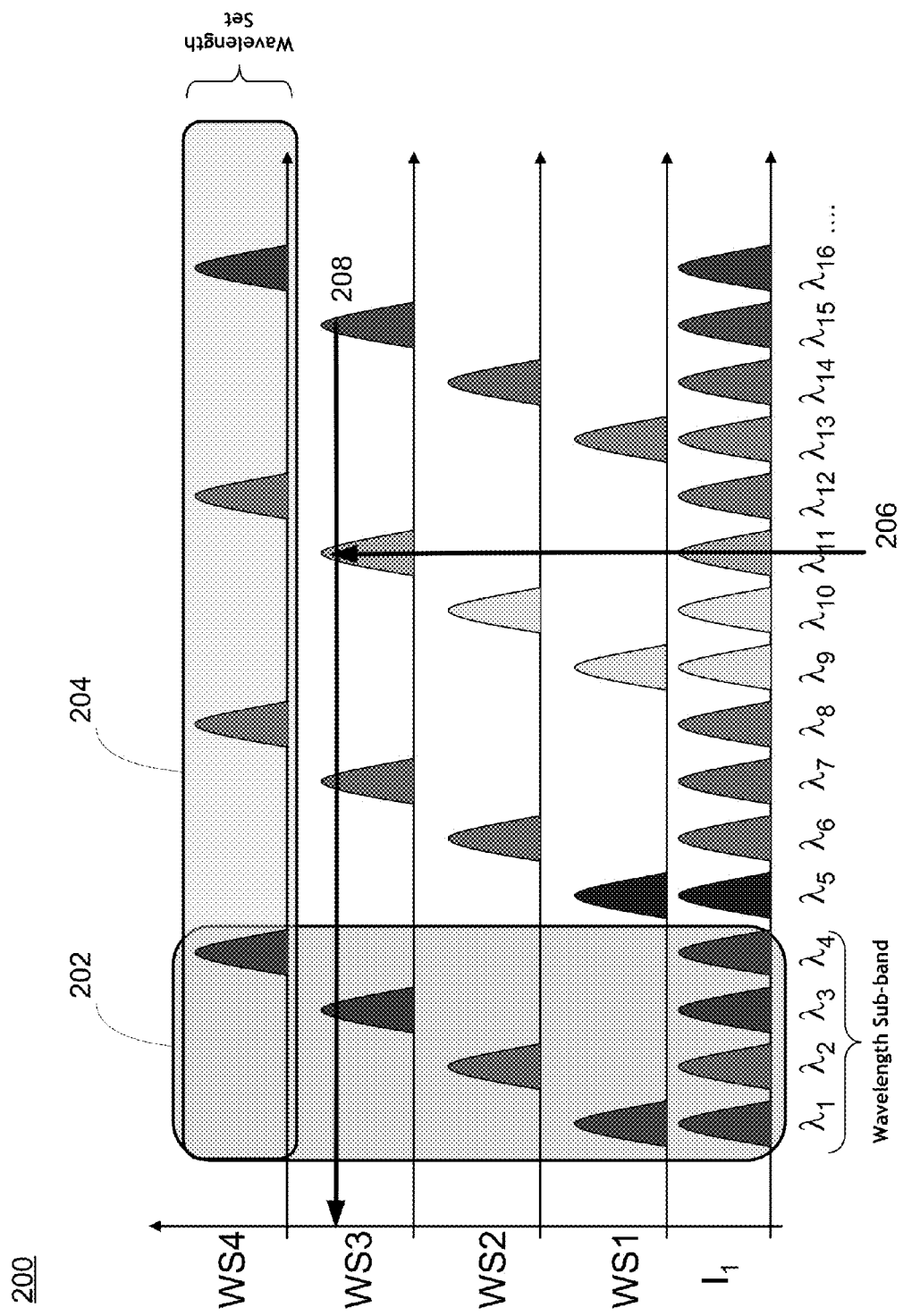
FIG. 2A illustrates an example wavelength group, according to example embodiments of the present application.

FIG. 2A illustrates a group of wavelength bands 200 according to an example embodiment of the present application. Referring to FIG. 2A, a wavelength sub-band 202 is illustrated as having four different wavelengths or frequencies $\lambda_2$, $\lambda_2$, $\lambda_3$ and $\lambda_4$. Each of the four wavelengths is part of a different wavelength set 204, which also includes four wavelengths. In the wavelength sets WS1, WS2, WS3 and WS4, each set includes one wavelength from each wavelength sub-band.

Tuning from one wavelength in a particular wavelength set to another in the same set may be performed by applying heat only. According to one example, heat may be applied to tune between wavelengths. For example, a laser may be tuned to a particular wavelength that is between two of the optical wavelengths required by the ONT and/or OLT. By applying heat to the laser, the wavelength may adjust to a discrete wavelength that is recognized by the optical system.

In another example, the external temperature may cause the operating wavelength to shift away from a particular operating wavelength. For instance, a first or current operating wavelength may be $\lambda_7$ of WS3. The laser may be currently operating at $\lambda_7$ of WS3, however, an increase in the external temperature may cause the laser's wavelength to shift upwards towards $\lambda_8$ or $\lambda_9$. In this case, it may be desirable to continue operating within the predefined wavelengths of the same wavelength set WS3. As a result, the optical laser may apply heat via the embedded heat source in the laser die or via an external heat source affixed to the laser device. The heat may be controlled to only modify the present wavelength to the next wavelength $\lambda_{11}$ in the wavelength set WS3 as 206.

By providing both the heater and the temperature sensor in the same laser die, or chip, the overall thermal mass of the laser is reduced, facilitating quick thermal response time and lower electrical power requirements for temperature control. Additionally, since the laser, heater, and the temperature sensor are all included in the same die, or chip, the impact on cost of an assembled laser is low. This configuration provides a low time constant on the order of microseconds.

In one example, a wavelength hop to a different wavelength in same wavelength set may be performed. The tuning procedure may foresee precautions in case of thermal tuning due to lower or upper bounds of the wavelength. In case the tuning of the wavelength by cooling the laser reaches a lower threshold, the ONU will need to warm up the laser in order to shift the wavelength to the next harmonic of the same wavelength set. Similarly, if the tuning of the wavelength by heating the laser reaches an upper threshold, the ONU needs to cool down the laser to the next lower harmonic of the same wavelength set.

Figure 2B:
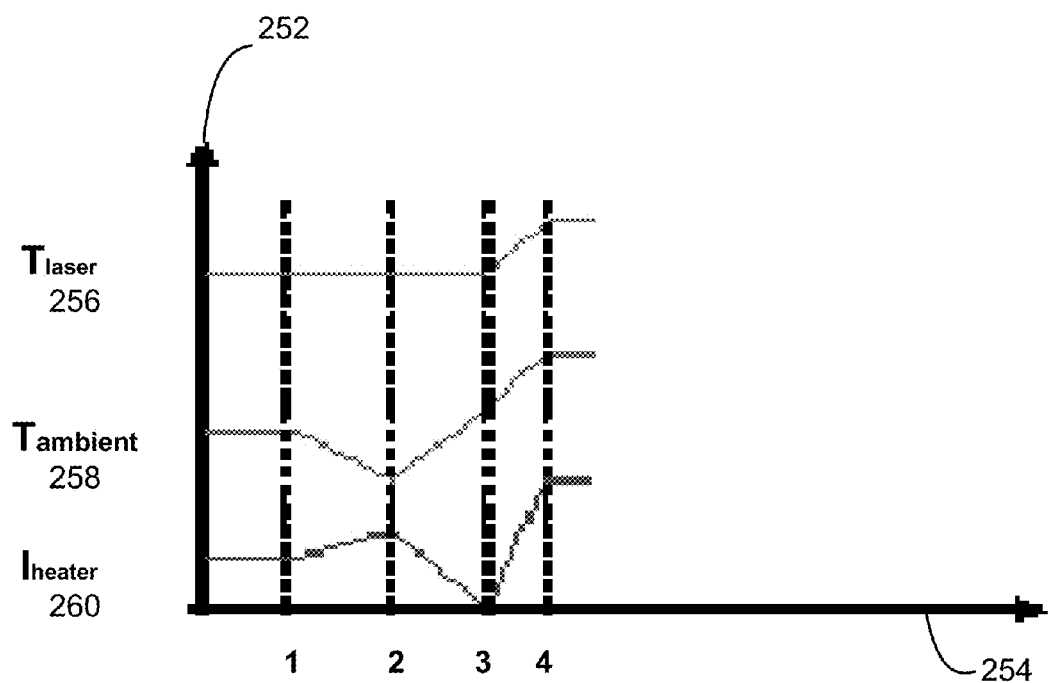
FIG. 2B illustrates an example temperature graph over time for the laser, heater and ambient temperature, according to example embodiments of the present application.

Referring to FIG. 2B, the graph 250 illustrates changes that occur in the heater current with the changes in ambient temperature on the temperature 252 vs. the time axis 254. The laser temperature 256, the ambient temperature 258 and the heater's temperature 260 are shown. In case the heater reaches its lowest value, while the ambient temperature is blocking the correct temperature from being reached, a wavelength hop needs to be initiated since there is no way to control the temperature in this example. This process is a local ONU process, which must ensure that the ONU sends no upstream data during that time. FIG. 2A, illustrates a first wavelength 208 being tuned to a next wavelength 206. The ONU can locally hold the traffic in a queue and ignore upstream grants from the MAC protocol. The OLT, however, may treat the empty responses to grants as errors. Moreover, a non-status reporting algorithm may wrongly interpret this data as there is no upstream queued and this reduces the number of upstream grants. It is therefore best to report the event of a wavelength hop via a PLOAM message to the OLT prior to the wavelength hop. The lower and upper wavelength thresholds should be select with a sufficient hysteresis margin such that a wavelength hop remains a rare event and so the transitions do not go repeatedly back and forth between an upper and a lower value. It takes only about 200 µs (TBC) to tune the laser across the entire wavelength range time, which is comparable to the duration of a quiet window and hence tolerable by the system to cause no interruption of regular data traffic.

Communication between the OLT and the ONU may provide a set of operations. The current upstream channel (from OLT to ONU) must be identified since the ONU does not have any information at start-up about its current wavelength, the OLT communicates on which channel and corresponding BM Rx it has observed a successful detection by SN read and/or by deciding on the strongest RSSI value. This may be performed by a channel number (e.g. #1-#4), but other options, such as a wavelength or frequency value or one element of the wavelength set are also possible options. The target upstream channel from the OLT to the ONU may have a relative wavelength shift positive or negative relative to the current value above since this is more meaningful in a WSDM scheme than an absolute value. It should be possible to express the relative change as a fraction of the channel spacing, because the current upstream position may not yet be at its optimum position and may require a correction.

The relative change can be expressed as a number of steps between channels. It should be possible to cover the entire range to reach the next pass band of a wavelength set to control a wavelength hop or any channel in between. In one example, an 8-bit code may be used with 1 bit for the sign direction, and 7 bits to cover the range. With 4 channels, there are 32 delta-steps between each channel and 128 steps to cover the entire range. Other options such as a relative wavelength value in nm or absolute values are also possible. A target downstream channel from an OLT to an ONU may be communicated to the ONU as to which channel it needs to tune. This can be communicated via a channel number (e.g. #1-#4), but other options, such as a wavelength value are also possible.

At the start of activation, the ONU may not be aware of the current filter position for the downstream channel. As the ONU applies a local control algorithm to scan the filter values until it successfully receives downstream framing, it should be able to detect on which channel number it is tuned. The existing PON-ID may be used so that it is in the current standard downstream physical layer synchronization block (PSBd) as defined in GPON or XG-PON1, but any other message can be used for that purpose. If the current downstream channel is different from the target downstream channel, message (c) with the target downstream channel defined above is sufficient for the ONU to make the necessary channel change.

The communication message may be conveyed as fields in a single physical layer message. There is no need for a separate field for other messages in the sequence since the PON-ID in the PSBd of the downstream frame can be used. There could however also be a fourth field for a fourth message (d). As in GPON or XG-PON1, this could be implemented in a new type of physical layer operations and maintenance (PLOAM) message. A same message type can be used to convey a combination of values, or only convey some of the fields meaningful, and leave other fields as no operation to keep the value currently set in the ONU or a predefined default value.

The message is broadcast downstream on the PON. A specific ONU is addressed either by an ONU-ID (if the ONU is already known to the OLT via its management system), or by a serial number value that the ONU has just conveyed upstream. In this configuration, a "random delay method" may be used to avoid collisions between new ONUs that simultaneously attempt to join the PON. Since the ONU is autonomously deciding on the update of a wavelength during the initialization sequence and does not use a feedback from the OLT about how much the wavelength should be shifted, multiple ONUs can simultaneously step through the wavelength tuning process. The number of steps can be different for each ONU and the steps of different ONUs are uncorrelated. Only when a SN is successfully read by the OLT and an ONU-ID is assigned, an individual ONU can be addressed by a feedback about a wavelength shift, as used for the fine tuning procedure.

The serial-number request may have been issued to all ONUs in the power-setup state and the serial-number state, and thus a response from more than one ONU might be produced. A problem may occur when more than one PLSu transmission or Serial_Number transmission arrives at the same time at the OLT, thus causing a collision. The random delay method may be used to resolve this dilemma. Based on the random delay method, each PLSu transmission and serial_number transmission is delayed by a random number of delay units generated by each ONU. The delay units are 32 bytes long for all bit rates. The random delay must be an integral number of delay units. Following each response to a Serial_Number request, the ONU generates a new random number, thus collisions are easily and efficiently prevented.

The random-delay range is 0-50 µs. This range is measured from the beginning of the earliest possible transmission (with zero processing delay) to the end of the latest possible transmission. The ONU internal processing delay and the duration of the upstream burst is included in the random-delay range and therefore should be taken into account when selecting a new random delay value. In the conventional example of FIG. 3A, which is based on the Gigabit PON G.984.3 standard of the "power_setup-transmission", the power setup is in the ONU transmitter tuning case of the "wavelength_setup-transmission". The ONUs 310 and 330 perform power setup and the OLT 320 manages the process.

Figure 4:
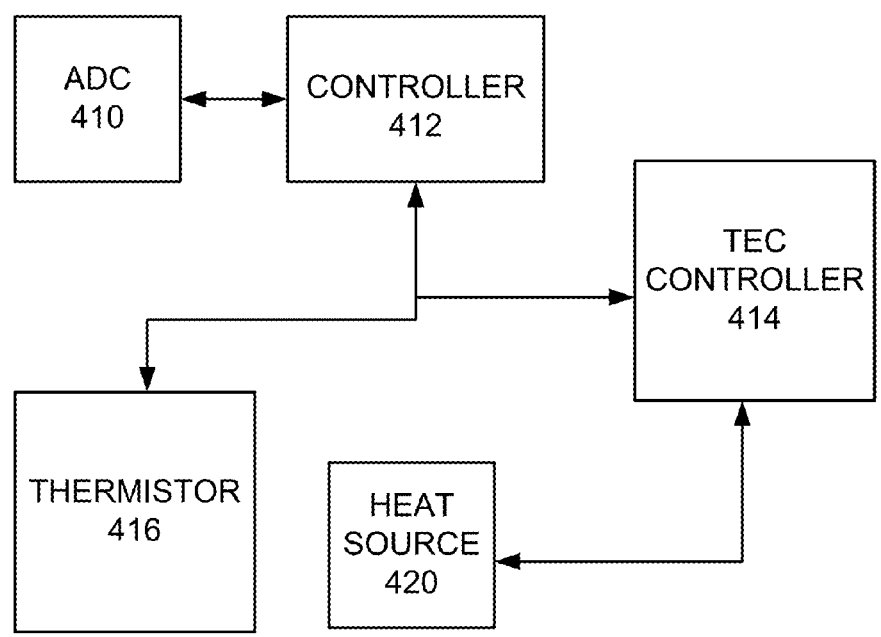
FIG. 4 illustrates an example logic diagram of a heater controller device according to example embodiments.
Figure 5:
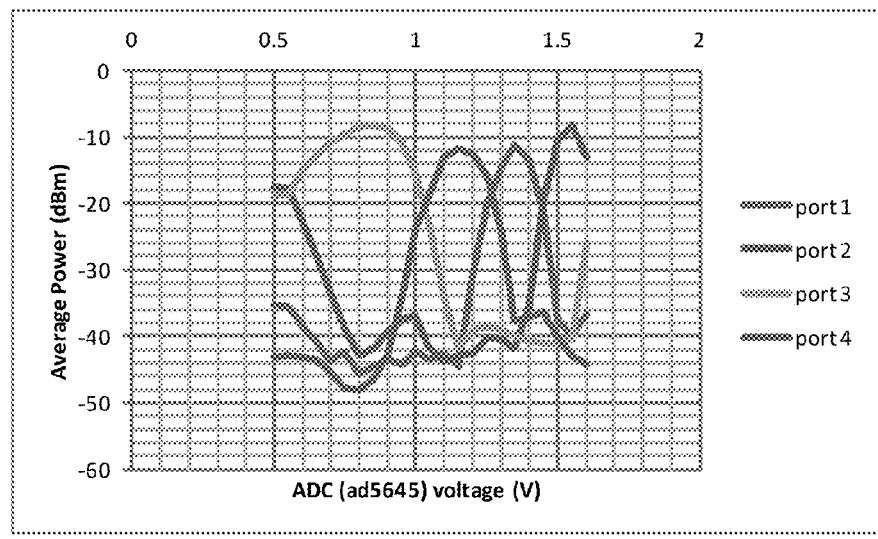
FIG. 5 illustrates an example graph of the power vs. the voltage measured at different ports.

The processes for identifying an optimal heater setting may utilize the successful reading of the serial number during coarse tuning and RSSI measurements during fine tuning. The ONU transmitter wavelength may be aligned to the cyclic AWG WDM that demuxes the upstream wavelengths to the different OLT PON receivers for optimal upstream transmission. FIG. 5 illustrates a power voltage chart 500 for power measured with a regular power measurement and no RSSI in each AWG port as a function of ADC input, using 0.05 Volt steps. At higher temperatures and higher heater resistance, higher resolution is needed at input ADC 410 of the logic diagram of the controller configuration 400 of FIG. 4. The controller configuration 400 may include an ADC 410, a main controller 412, a TEC controller 414, and a thermistor 416 to measure the temperature used to instruct the heat source 420.

One type of configuration to align the ONU wavelength is to measure optical power at the OLT and tune the heater 420 via TEC controller 414 at the ONU until a maximum optical power has been found at the OLT receiver. One concern is that the upstream transmission is operating in burst mode.

Timing the RSSI measurement is an intensive task. If the ONU is not yet known to the system then the it is not easy to ascertain an optimal time to transmit an optimal RSSI measurement. The RSSI is measured linearly and represented using 16 bits:

−40 dBm=0.1 μW=0x000x01
−37 dBm=0.2 μW=0x00 0x02
−35.2 dBm=0.3 μW=0x00 0x03
−34 dBm=0.4 μW=0x00 0x04
−33 dBm=0.5 μW=0x00 0x05
−32.2 dBm=0.6 μW=0x00 0x06
−31.5 dBm=0.7 μW=0x00 0x07
−31 dBm=0.8 μW=0x00 0x08
−30.5 dBm=0.9 μW=0x00 0x09
−30 dBm=1.0 μW=0x00 0x0A
|
−27.5 dBm=1.78 W=0x00 0x12
|
+8.16 dBm=6.5536 mW=0xFF 0xFF.

The powers of our interest are on the edge of the RSSI window, also the resolution (0.1 μW) is considered course.

Figure 6:
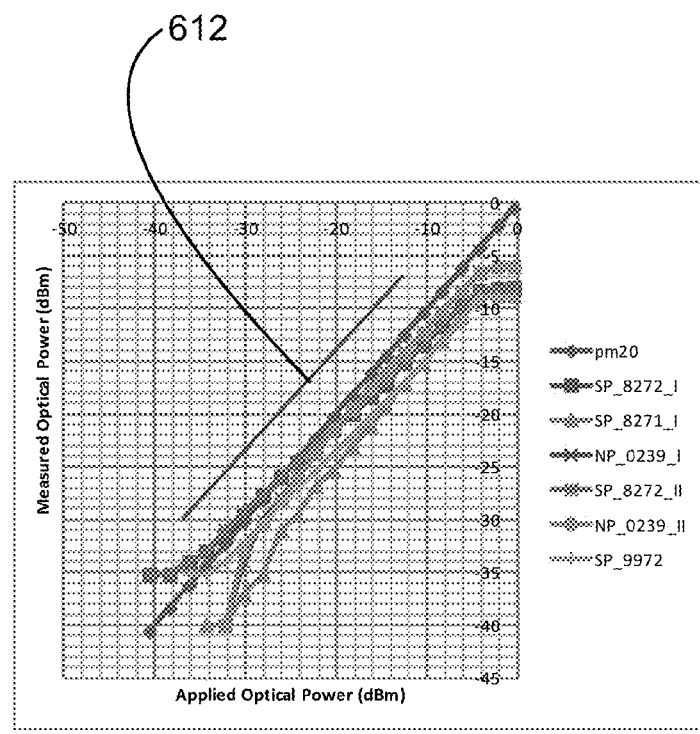
FIG. 6 illustrates an example graph of the applied power vs. the measured power.

Timing the RSSI measurement is an intensive task. If the ONU is not yet known to the system then it is not easy to ascertain an optimal time to transmit an optimal RSSI measurement. The RSSI is measured linearly and represented using 16 bits. FIG. 6 illustrates a series of RSSI measurements on a graph 600 by several different XGPON1 OLT XFPs. SP=SourcePhotonics and NP=NeoPhotonics. The first curve line 612 indicates a desirable RSSI curve for optimizing digital RSSI representation resolution.

In FIG. 6 the measured RSSI curve is illustrated in comparison to the true optical power measured for different XGPON1-OLT XFPs. Some modules measured multiple times and it can be seen that the RSSI measurement is reproducible. The majority of RSSI measurements provide for an RSSI value that is below the true value. Also most of the measured RSSI curves are reasonable parallel to the true curve. Another optimization could be that we dimension the optical power budget such that the input power into the OLT Rx is a bit higher compared to XGPON1 by over dimensioning the upstream SOA gain compared to the cyclic AWG loss.

Figure 8:
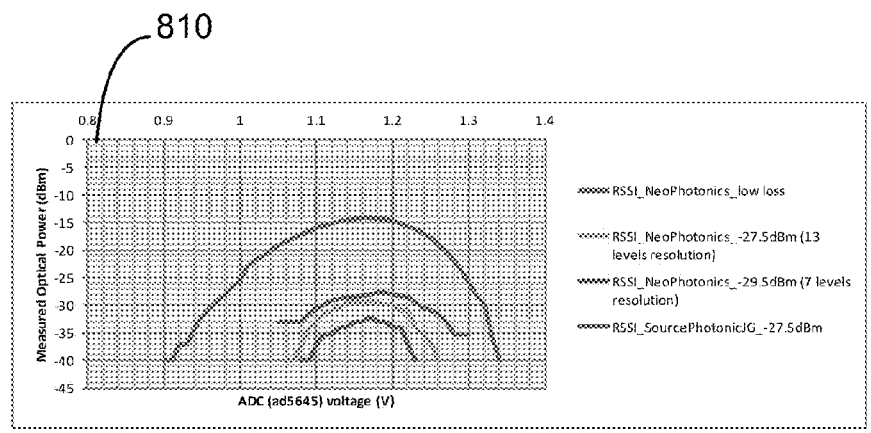
FIG. 8 illustrates an example graph of the voltage vs. the measured optical power according to example embodiments.

FIG. 8 illustrates a graph 800 of the 0.01 volt steps at the input ADC. The accuracy of a RSSI power measurement is +/−3 dB, a negative offset leaves less levels to present the optical power. The RSSI of the NeoPhotonics module may have a negative offset from the true optical power which is just 13 levels optical power resolution and that is ~0.2 V window around optimum ADC input (out of ~1.6 V total), to find peak using RSSI for N1 class. In FIG. 8, there are various different curve characteristics 810 for the voltage vs. optical power of the different RSSIs. There are 7 levels resolution and a ~0.15 V window at the optimum AD5645 (quad digital to analog converter) input to find a peak using RSSI for N2 class. The RSSI of the SourcePhotonics module measures closer to true optical power which should result in more available levels to present the optical power compared to the used NeoPhotonics module, however this module does not present powers below ~−35 dBm, so also this module has a limited number of levels in a range of interest.

Figure 7:
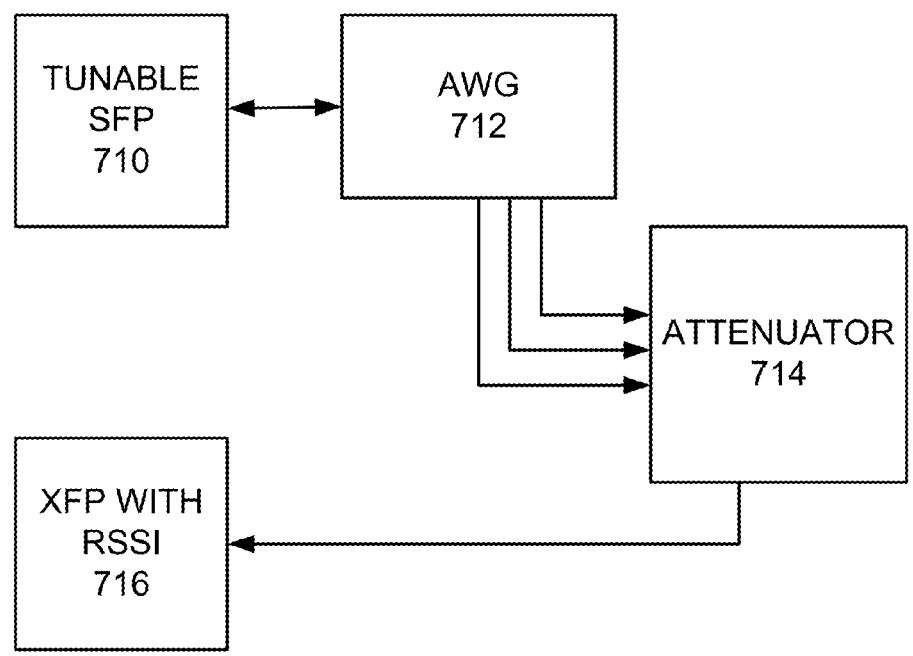
FIG. 7 illustrates an example logic diagram of the tuning setup and measurement logic according to example embodiments.

When the shape of the cyclic AWG filter is known one can predict the correct heater setting from one power measurement on all ports at the same time. The logic diagram 700 of FIG. 7 provides a tunable SFP 710 that works with the AWG filters 712 which triggers the attenuator 714 to control the XFP 716 of the ONU via the RSSI measurements. The ratio of the measured powers can be used to estimate the correct setting of the tuning heater. The random delay method will avoid the case where two or more new ONUs are being measured at the same time. A small ratio indicates that the optimal setting is close.

Accuracy depends on the cyclic AWG filter characteristics, for example non-uniform loss. Another factor is the range that the RSSI can measure. Predicting optimum tuning from two measurements is based on sensitivity. RSSI measurements can only observe power in 2 ports around the crossover points. The tuning of the ONT laser wavelength is a fundamental requirement in a PON system. Providing the ability to use un-calibrated laser components implementing these heater management approaches for field calibration saves component manufacturing costs and permits adaptation for various changes in the PON system. By controlling the ONT laser adjustments during activation from the OLT provides a full system feedback loop. As a result, the wavelength settings can be made accurately and quickly.

Figure 9:
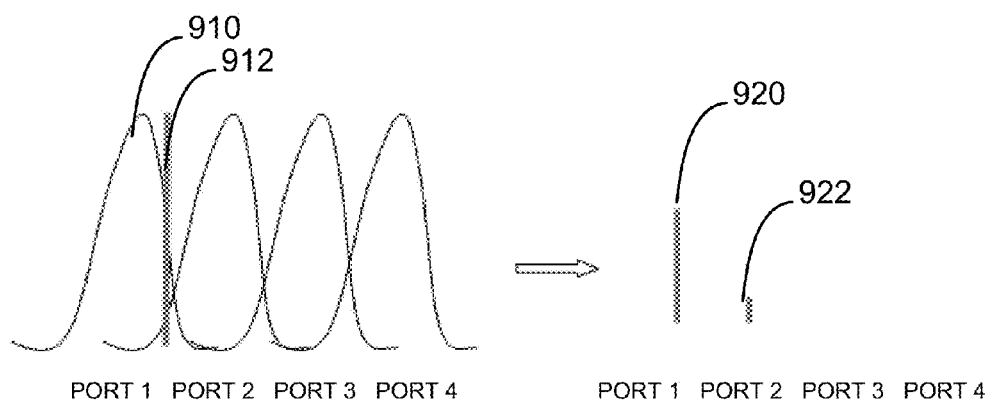
FIG. 9 illustrates an example prediction measurement from an RSSI measurement according to example embodiments.

FIG. 9 illustrates an example of a prediction function based on the RSSI measurement. Referring to FIG. 9, the various ports 900 have their own respective signal measurements, and the shape of the cyclic AWG filter may be known so that one can predict the correct heater setting from one power measurement on all ports at the same time. The first port signal 910 may be identified from the filter characteristics 912, which can be used as the basis for adjustments 920 and 922 to ports 1 and 2, respectively. The line 912 represents the wavelength and signal power of the upstream transmission received by the OLT. The other lines 920 and 922 represent the amount of power from that transmission that is passed through ports 1 and 2, respectively, of the AWG filter. If the laser heater is adjusted to move the line 912 to the left then the line 920 would become larger and the line 922 would become smaller.

In the present application, the OLT may perform a comparison of the RSSI values on the different ports and transmit a relative wavelength change message to the ONU. The ONU receives the RSSI values and can locally make a determination about the necessary wavelength shift without instructions from the OLT. In this example, a new message type will be required with a RSSI value per channel and a destination either by ONU-ID or by a serial number.

According to example embodiments, to avoid having to accurately measure the optical power of a burst mode signal, the optimum heater setting may be identified without measuring power. One method is to measure signal quality at the OLT receiver and use that to optimize the ONU transmitter tuning. A successful serial number read may also be performed which may be used during coarse tuning. The use of the cyclic redundancy check (CRC) or an error count from the FEC decoder may also be used. A search for the optimum level may be performed by a preamble count of packets.

The prediction function that may be derived from the example illustrated in FIG. 9 is used to permit the OLT to rapidly tune a newly register ONT to a correct wavelength. According to one example, when an uncalibrated ONT attempts to register on the PON, the wavelength of its laser is generally unknown at such time by the management devices or other components of the PON.

In operation, the ONT may transmit an upstream message to the OLT and a received signal strength indication (RSSI) measurement may be simultaneously measured on all ports of the AWG filter. In an ideally tuned system, the upstream signal would be centered at a single filter port with no signal power appearing in the other filter bands. In the present example, when signal power from the upstream transmission is detected in two adjacent filters the prediction function calculates the correct heat adjustment needed to center the ONTs laser wavelength with the appropriate filter. This calculated wavelength correction is sent to the ONT from the OLT so an adjustment may be performed at the ONT.

Figure 10:
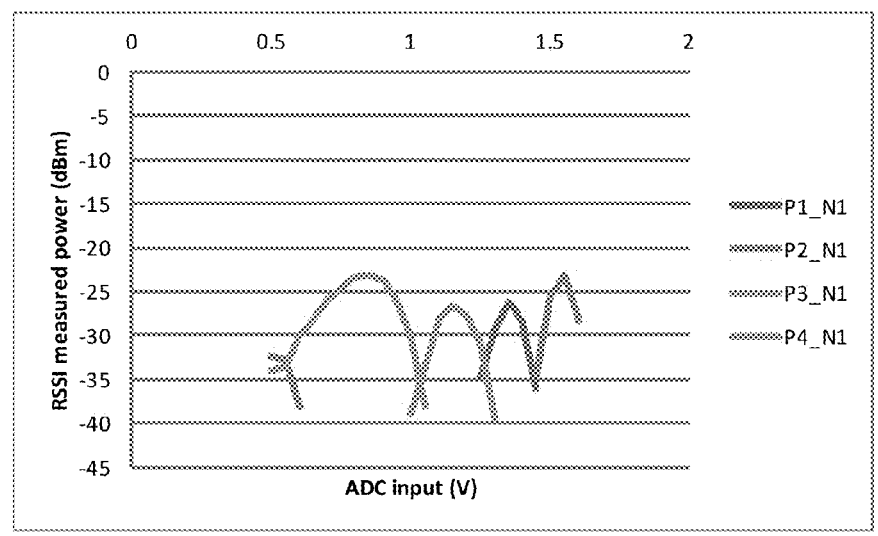
FIG. 10 illustrates an example graph of a voltage input vs the RSSI power measured according to example embodiments.

FIG. 10 illustrates a graph 1000 with various different curve characteristics of different RSSI powers measured at an OLT for different ports. A simpler implementation than the above error measurement is counting the number of alternating "1"s and "0"s in a 10101 . . . preamble pattern and comparing it to a pre-set value. It is acknowledged that this method will be less accurate than the error measurement, but may allow for a very simple implementation to identify an optimal power value and related characteristics. A low rate training sequence may include a SNR for thermal noise in a limited case with small optical powers. In this example, the $SNR = R_L R^2_d P^2_{in}/4k_B T F_n \Delta f$; with $R_L$=load of the resistor, $R_d$=responsivity of the photodiode, $P_{in}$=optical input power, $k_B$=Boltzman constant, T=temperature, $F_n$=amplifier noise figure, $\Delta f$=effective noise bandwidth. In this case, the SNR is independent of a bitrate if the same receiver is used. A better sensitivity could be achieved when the bandwidth of the receiver is tunable. Decreasing bandwidth would decrease $\Delta f$ and also $F_n$.

In one example, oversampling may be performed by 4 times to read the serial number (SN), preferably in the same ranging window as it would be faster than the multiple ranging windows needed for finer wavelength tuning. Another prediction method can be based on the basis that the AWG filter is symmetric. When the two cross-over points of an AWG are identified, the optimum middle of the AWG filter can be deducted. When the ONU transmitter is tuned to a crossover point of the AWG, the ONU serial-number (SN) will not be readable to the OLT. Scanning through the filter results 1112 may provide correct and incorrect SN readings, the optimal setting 1114 is in the middle of the correct SN reading range 1116 as illustrated in the diagram 1100 of FIG. 11.

Figure 11:
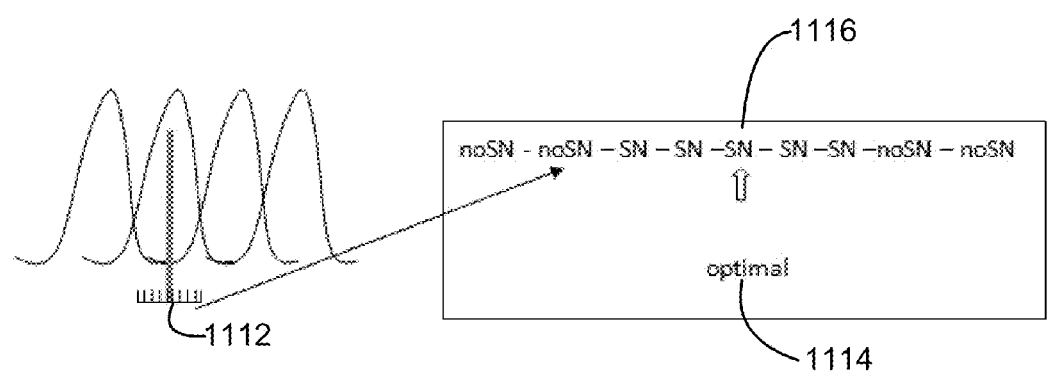
FIG. 11 illustrates an example prediction measurement from a AWG filter according to example embodiments.

The example in FIG. 11 is an alternative process to rapidly tune the ONTs upstream wavelength when performing a registering operation. The optimal tuning point can be identified as a mid-point between two cross-over points. The cross-over point is where the OLT can start identifying a valid serial number (SN). When an ONT attempts to become registered on a PON it sends its SN upstream in response to an OLT SN request message. After the OLT receives the SN from an ONT, the OLT will then assign an ONU-ID to the ONT. Both the SN and ONU-ID are unique identifiers for the ONT.

A variation could be used to identify the error detection capability of the FEC, a pseudo error monitor, an eye-opening monitor or a special test word that is known by the OLT receiver. In most cases, the lamda value (heater setting) function is good reproducible, and a table lookup is a way to obtain the wavelength relative close, such that just a few more tuning steps are needed to fully tune. Recording of heater settings is very useful for assisting an ONU to join quickly that has already been on the PON before.

Tuning algorithms can be divided up so the OLT controls the algorithm and/or the ONU controls the algorithm. When the ONU controls the procedure, the ONU will determine a tuning function based on acknowledgements from the OLT, the ONU would still use the ranging window that is setup by the OLT. When the OLT controls the tuning, it informs the ONU how to tune its wavelength from measurements performed by the OLT. The ONU controlled protocol operates so the OLT does not need to know which device is which until there is correct communication and therefore more than one ONU can try to join in one window. In an OLT controlled function only one ONU can try to join until the ONU has been identified. At that point the identified (SN) ONU can still fine tune while a new unknown ONU can try to join the tuning procedure. The parameters used to compare the tuning methods are delay and accuracy. Delay effects how long it takes for an ONU to join the PON. Accuracy effects the available optical power budget, non-optimal tuning results in a power penalty due to insertion loss of the AWG.

According to one example embodiment, a method of remotely configuring an optical network unit (ONU) may provide transmitting a first wavelength configuration message to the ONU, which includes information, such as an ONU transmission wavelength and a receive wavelength. The first wavelength configuration message may also be transmitted to the ONU to include a wavelength set and/or a channel identifier. The message may also include an ONU transmission channel, which may be defined as a wavelength or wavelength set. The message may also provide details of the current channel via its channel identifier. The instructions may cause the ONU to perform a wavelength change different from its current wavelength.

The message/instruction may be transmitted to the ONU after a wavelength configuration message is transmitted that defines the current channel. The relative wavelength change may be proportional to the channel spacing and may be a frequency or unit of frequency. The configuration message may originate from the OLT and may be transmitted in response to receiving a message from the ONU. The ONU-ID may be assigned to the ONU and the configuration message may be transmitted after the ONU-ID is assigned. The message may be transmitted as part of an ONU activation process. The ONU may receive a SN request on a first SN request wavelength. The SN response may be received from the ONU and the ONU-ID may be assigned after the SN response is received.

In the event that the SN request was not successful, then another SN request may be transmitted at a different wavelength than a wavelength used to transmit the first SN request. The SN request may also be transmitted at the onset of a quiet window when no other PON traffic is scheduled to be transmitted. The open window may be opened on multiple upstream wavelength channels in the PON to avoid collisions in any of the channels during the activation cycle. The wavelength correction message may only be transmitted if the ONU is identified as operating on the wrong channel. One way to determine if the ONU is operating on the correct channel is to observe the signal received at the target receiver channel or by transmitting a query to identify the current channel wavelength. Also, the signal quality may be tested and if it is below or above a particular threshold, the signal may be associated with the correct/incorrect channel. Or, alternatively, the signal quality may be observed and compared to a different receive signal quality to identify the quality level. The various different receivers may be operating behind a cyclic wavelength demultiplexer or arrayed waveguide grating at the OLT and must be performed after the query and during a quiet window on all channels. The signal quality may also be identified as the ability to read the signal data or the signal's strength, such as optical power level. Other signal strength measurement functions may also be used.

In another example, the current relative or absolute wavelength may be equal to the passband of the wavelength demultiplexer port at which the receiver with the best observed signal power value is presently operating. Also, the signal quality of multiple receivers of different wavelength demultiplexer ports may be used to determine a more accurate relative or absolute wavelength, which can then be a wavelength channel plus a relative fraction of the spacing between adjacent channels. A target transmission wavelength may be setup by the ONU based on the various power and signal quality measurements observed.

During communication between the ONU and the OLT, the first wavelength configuration message may assign a wavelength. The message may also be a physical layer, operations and management (PLOAM) type of message. When the RSSI is measured from a received signal the transmit wavelength may be identified based on one or more RSSI measurements. The ONU may autonomously change its present transmission wavelength in short intervals of wavelength change to evaluate each shift one by one to identify whether the last wavelength shift results in a coherent or acceptable signal via RSSI measurements, data recognition and/or signal to noise ratio (SNR). Once a successful shift is identified the activation procedure may be finished.

The initiation procedure may begin with an initiation wavelength $W_I$. The next wavelength may be $W_{I+N}$ where N=minimum wavelength shift. The procedure may include utilizing the initial wavelength, transmitting a particular message(s) and then identifying the message contents to determine the success of the transmission. The test may have a threshold amount of RSSI measurement data required and below which is unacceptable. A change in the wavelength may be controlled by a controller that changes the wavelength to a higher or lower pass band of the same wavelength set channel when a limit of the tuning range is reached. Threshold wavelength values may be used to identify the limit and may be a margin larger than the minimum range, and to identify a margin below the maximum of the tuning range. The upper and lower threshold values may be selected to span a range of more than two pass bands of the same wavelength to prevent the setting from hopping back and forth between the two pass bands (i.e., hysteresis range). The upstream data transmissions may be prevented when a wavelength is being tuned to a next pass band in the same wavelength set channel or a change to a new wavelength set channel in order to avoid cross talk to data on other traffic channels. Upstream data can be stopped locally by the ONU that ignores grants in the upstream bandwidth map until the tuning is complete.

In another example, the maximum wavelength of the pass band of the filter at the receiver of the ONU may be tuned by local evaluation via the signal quality transmitted to the ONU. Signal quality measurements may include measuring the optical power level of the signal at the receiver in the ONU and attempting to maximize optical power by a locally controlled dithering procedure. Also, measuring the bit errors of the downstream data received at the ONU and identifying a minimum number of errors by the dithering procedure. A wavelength range may be identified for successful readings of the data content received by the ONU and the middle of that range may be designated as the maximum value. Also, a downstream wavelength channel may be determined by reading a channel identifier or PON identifier in the data stream as part of a frame header or dedicated message.

Figure 12:
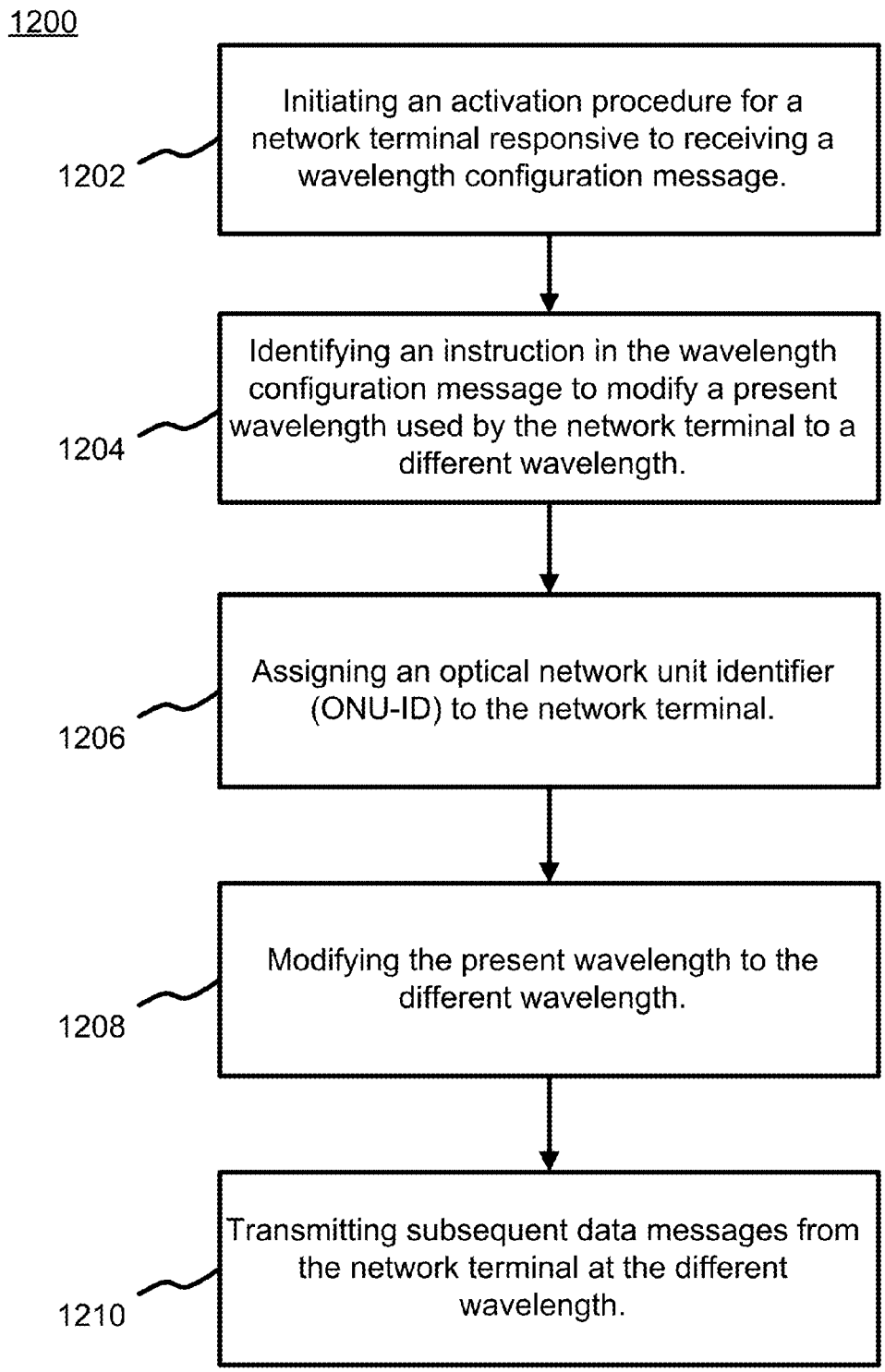
FIG. 12 is a flow diagram of an example method of operation according to example embodiments.

FIG. 12 illustrates an example method of operation that includes a process 1200 with initiating an activation procedure for a network terminal responsive to receiving a wavelength configuration message at operation 1202, identifying an instruction in the wavelength configuration message to modify a present wavelength used by the network terminal to a different wavelength at operation 1204 and assigning an optical network unit identifier (ONU-ID) to the network terminal at operation 1206. The method may also include modifying the present wavelength to the different wavelength at operation 1208 and transmitting subsequent data messages from the network terminal at the different wavelength at operation 1210.

The operations of a method or algorithm described in connection with the embodiments disclosed herein may be embodied directly in hardware, in a computer program executed by a processor, or in a combination of the two. A computer program may be embodied on a computer readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

An exemplary storage medium may be coupled to the processor such that the processor may read information from, and write information to, the storage medium. In the alternative, the storage medium may be integral to the processor. The processor and the storage medium may reside in an application specific integrated circuit ("ASIC"). In the alternative, the processor and the storage medium may reside as discrete components. For example, FIG. 13 illustrates an example network element 1300, which may represent any of the above-described components of the previous drawings.

Figure 13:
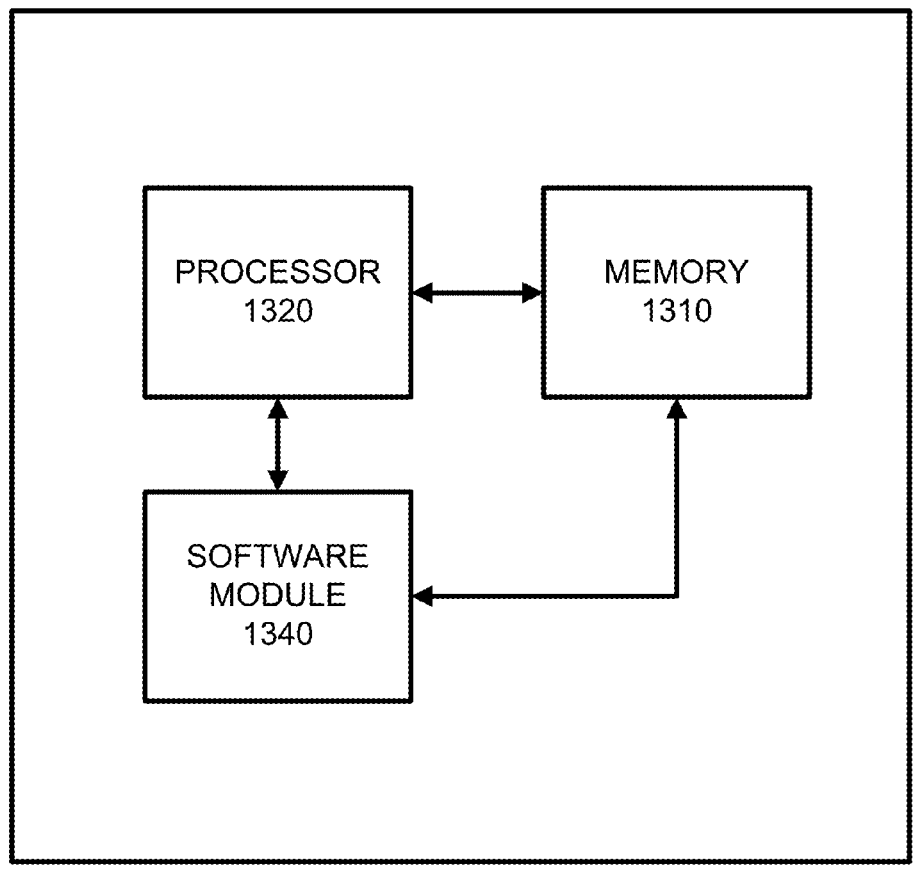
FIG. 13 illustrates an example network entity configured to perform the operations of the present application, according to example embodiments of the present application.

As illustrated in FIG. 13, a memory 1310 and a processor 1320 may be discrete components of the network entity 1300 that are used to execute an application or set of operations. The application may be coded in software in a computer language understood by the processor 1320, and stored in a computer readable medium, such as, the memory 1310. The computer readable medium may be a non-transitory computer readable medium that includes tangible hardware components in addition to software stored in memory. Furthermore, a software module 1330 may be another discrete entity that is part of the network entity 1300, and which contains software instructions that may be executed by the processor 1320. In addition to the above noted components of the network entity 1300, the network entity 1300 may also have a transmitter and receiver pair configured to receive and transmit communication signals (not shown).

Although an exemplary embodiment of the system, method, and computer readable medium of the present application has been illustrated in the accompanied drawings and described in the foregoing detailed description, it will be understood that the application is not limited to the embodiments disclosed, but is capable of numerous rearrangements, modifications, and substitutions without departing from the spirit or scope of the application as set forth and defined by the following claims. For example, the capabilities of the system can be performed by one or more of the modules or components described herein or in a distributed architecture and may include a transmitter, receiver or pair of both. For example, all or part of the functionality performed by the individual modules, may be performed by one or more of these modules. Further, the functionality described herein may be performed at various times and in relation to various events, internal or external to the modules or components. Also, the information sent between various modules can be sent between the modules via at least one of: a data network, the Internet, a voice network, an Internet Protocol network, a wireless device, a wired device and/or via plurality of protocols. Also, the messages sent or received by any of the modules may be sent or received directly and/or via one or more of the other modules.

One skilled in the art will appreciate that a "system" could be embodied as a personal computer, a server, a console, a personal digital assistant (PDA), a cell phone, a tablet computing device, a smartphone or any other suitable computing device, or combination of devices. Presenting the above-described functions as being performed by a "system" is not intended to limit the scope of the present application in any way, but is intended to provide one example of many embodiments of the present application. Indeed, methods, systems and apparatuses disclosed herein may be implemented in localized and distributed forms consistent with computing technology.

It should be noted that some of the system features described in this specification have been presented as modules, in order to more particularly emphasize their implementation independence. For example, a module may be implemented as a hardware circuit comprising custom very large scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together, but may comprise disparate instructions stored in different locations which, when joined logically together, comprise the module and achieve the stated purpose for the module. Further, modules may be stored on a computer-readable medium, which may be, for instance, a hard disk drive, flash device, random access memory (RAM), tape, or any other such medium used to store data.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

It will be readily understood that the components of the application, as generally described and illustrated in the figures herein, may be arranged and designed in a wide variety of different configurations. Thus, the detailed description of the embodiments is not intended to limit the scope of the application as claimed, but is merely representative of selected embodiments of the application.

One having ordinary skill in the art will readily understand that the application as discussed above may be practiced with steps in a different order, and/or with hardware elements in configurations that are different than those which are disclosed. Therefore, although the application has been described based upon these preferred embodiments, it would be apparent to those of skill in the art that certain modifications, variations, and alternative constructions would be apparent, while remaining within the spirit and scope of the application. In order to determine the metes and bounds of the application, therefore, reference should be made to the appended claims.

While preferred embodiments of the present application have been described, it is to be understood that the embodiments described are illustrative only and the scope of the application is to be defined solely by the appended claims when considered with a full range of equivalents and modifications (e.g., protocols, hardware devices, software platforms etc.) thereto.

What is claimed is:

1. A method comprising:
    initiating an activation procedure for a network terminal responsive to receiving a wavelength configuration message, the wavelength configuration message comprising one set of acceptable wavelengths assigned to the network terminal from among a plurality of sub-bands of wavelengths assigned to a plurality of network terminals;
    identifying an instruction in the wavelength configuration message to modify a present wavelength used by the network terminal to a different wavelength within the set of acceptable wavelengths indicated in the wavelength configuration message,
    receiving at the network terminal an optical network unit identifier (ONU-ID) assignment;
    identifying a present signal quality transmitted from the network terminal based on a signal transmitted from a transmitter of the network terminal;
    determining the current wavelength utilized by the network terminal is incorrect based on the signal quality of the signal transmitted from the transmitter of the network terminal;

modifying the present wavelength to the different wavelength; and transmitting subsequent data messages from the network terminal at the different wavelength.

2. The method of claim 1, wherein the wavelength configuration message further comprises at least one of a transmission wavelength to be used by the network terminal and a receiving wavelength to be used by the network terminal.

3. The method of claim 1, wherein the wavelength configuration message is received from an optical line terminal (OLT) in response to a previously transmitted message from the network terminal.

4. The method of claim 1, wherein assigning the optical network unit identifier (ONU-ID) to the network terminal is performed prior to receiving the wavelength configuration message.

5. The method of claim 4, further comprising:
identifying the network terminal is operating at an incorrect wavelength; and
receiving the wavelength configuration message responsive to the incorrect wavelength being identified.

6. An apparatus comprising:
a receiver;
a processor configured to
initiate an activation procedure responsive to a wavelength configuration message received via the receiver, the wavelength configuration message comprising one set of acceptable wavelengths assigned for use from among a plurality of sub-bands of wavelengths assigned to a plurality of network terminals;
identify an instruction in the wavelength configuration message to modify a present wavelength being used to a different wavelength within the set of acceptable wavelengths indicated in the wavelength configuration message;
receive an optical network unit identifier (ONU-ID) assignment;
identify a present signal quality based on a signal transmitted from the transmitter;
determine the current wavelength utilized is incorrect based on the signal quality of the signal transmitted from the transmitter;
modify the present wavelength to the different wavelength; and
a transmitter configured to transmit subsequent data messages at the different wavelength.

7. The apparatus of claim 6, wherein the wavelength configuration message further comprises at least one of a transmission wavelength to be used for subsequent data communications and a receiving wavelength to be used for subsequent data communications.

8. The apparatus of claim 6, wherein the wavelength configuration message is received from an optical line terminal (OLT) in response to a previously transmitted message from the transmitter.

9. The apparatus of claim 6, wherein the processor is configured to assign the optical network unit identifier (ONU-ID) prior to the wavelength configuration message being received.

10. The apparatus of claim 9, wherein the processor is further configured to
identify the network terminal is operating at an incorrect wavelength, and the receiver is further configured to receive the wavelength configuration message responsive to the incorrect wavelength being identified.

11. A non-transitory computer readable storage medium configured to store instructions that when executed cause a processor to perform:
initiating an activation procedure for a network terminal responsive to receiving a wavelength configuration message, the wavelength configuration message comprising one set of acceptable wavelengths assigned to the network terminal from among a plurality of sub-bands of wavelengths assigned to a plurality of network terminals;
identifying an instruction in the wavelength configuration message to modify a present wavelength used by the network terminal to a different wavelength within the subset of acceptable wavelengths indicated in the wavelength configuration message;
receiving at the network terminal an optical network unit identifier (ONU-ID) assignment;
identifying a present signal quality transmitted from the network terminal based on a signal transmitted from a transmitter of the network terminal;
determining the current wavelength utilized by the network terminal is incorrect based on the signal quality of the signal transmitted from the transmitter of the network terminal;
modifying the present wavelength to the different wavelength; and
transmitting subsequent data messages from the network terminal at the different wavelength.

12. The non-transitory computer readable storage medium of claim 11, wherein the wavelength configuration message further comprises at least one of a transmission wavelength to be used by the network terminal and a receiving wavelength to be used by the network terminal.

13. The non-transitory computer readable storage medium of claim 11, wherein the wavelength configuration message is received from an optical line terminal (OLT) in response to a previously transmitted message from the network terminal.

14. The non-transitory computer readable storage medium of claim 11, wherein assigning the optical network unit identifier (ONU-ID) to the network terminal is performed prior to receiving the wavelength configuration message.

15. The non-transitory computer readable storage medium of claim 14, further comprising:
receiving the wavelength configuration message responsive to an incorrect wavelength being identified.

* * * * *